US012228729B2

(12) United States Patent
Fan et al.

(10) Patent No.: US 12,228,729 B2
(45) Date of Patent: Feb. 18, 2025

(54) METHOD FOR DESIGNING DIFFRACTIVE OPTICAL ELEMENT AND PARTITIONED UNIFORM LIGHT ILLUMINATION SYSTEM

(71) Applicant: Jiaxing UPhoton Optoelectronics Technology Co., Ltd., Zhejiang (CN)

(72) Inventors: Zhentao Fan, Zhejiang (CN); Yuming Song, Zhejiang (CN); Kehan Tian, Zhejiang (CN)

(73) Assignee: Jiaxing UPhoton Optoelectronics Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/572,950

(22) PCT Filed: May 30, 2022

(86) PCT No.: PCT/CN2022/095969
§ 371 (c)(1),
(2) Date: Dec. 21, 2023

(87) PCT Pub. No.: WO2022/267836
PCT Pub. Date: Dec. 29, 2022

(65) Prior Publication Data
US 2024/0264433 A1    Aug. 8, 2024

(30) Foreign Application Priority Data
Jun. 22, 2021  (CN) .......................... 202110691207.8

(51) Int. Cl.
*G02B 27/00* (2006.01)
*G02B 27/09* (2006.01)
(52) U.S. Cl.
CPC ..... *G02B 27/0012* (2013.01); *G02B 27/0944* (2013.01)

(58) Field of Classification Search
CPC ............ G02B 27/0012; G02B 27/0944; G02B 27/4205; G02B 27/425
(Continued)

(56) References Cited

U.S. PATENT DOCUMENTS

2009/0304301 A1\* 12/2009 Hattori .................. H04N 5/772
382/275
2012/0038934 A1\* 2/2012 Miyasaka ............ G02B 5/1861
356/610
(Continued)

FOREIGN PATENT DOCUMENTS

CN    110596720 A    12/2019
CN    111580204 A    8/2020
(Continued)

OTHER PUBLICATIONS

English Translation of International Search Report and Written Opinion, Application No. PCT/CN2022/095969, Dated Aug. 18, 2022.
(Continued)

*Primary Examiner* — Audrey Y Chang
(74) *Attorney, Agent, or Firm* — Patterson + Sheridan, LLP (57) ABSTRACT

A method for designing a diffractive optical element comprises: determining parameters of a light source and a target light field of a diffractive optical element; according to the parameters of the light source, determining the distribution of a plurality of first microstructure units on the diffractive optical element; dividing the target light field into a plurality of target maps superimposed to form the target light field, the first microstructure units corresponding to the target maps; performing distortion pre-correction on the plurality of target maps separately; and according to the plurality of corrected target maps and the parameters of the light source, designing corresponding phase distributions of the plurality
(Continued)

diffractive optical element 40 of first microstructure units separately. A VCSEL partitioned light source may be combined with a diffractive optical element to project a uniform light field. The diffractive optical element is applied to a partitioned illumination system, which provides a uniform illumination.

20 Claims, 8 Drawing Sheets

(58) Field of Classification Search
USPC .............................................................. 359/9
See application file for complete search history.

(56) References Cited

U.S. PATENT DOCUMENTS

| | | | | |
|---|---|---|---|---|
| 2013/0038881 | A1* | 2/2013 | Pesach | ............... G02B 27/1086 356/610 |
| 2016/0197452 | A1* | 7/2016 | Mor | ........................ H01S 5/423 359/569 |
| 2017/0082862 | A1* | 3/2017 | Downing | ............ G02B 27/0012 |
| 2019/0162908 | A1* | 5/2019 | Moebius | ................. G02B 6/124 |
| 2020/0249012 | A1* | 8/2020 | Li | ......................... G02B 27/288 |

FOREIGN PATENT DOCUMENTS

| | | |
|---|---|---|
| CN | 111650681 A | 9/2020 |
| CN | 111913304 A | 11/2020 |
| CN | 113467077 A | 10/2021 |
| JP | 2007264386 A | 10/2007 |

OTHER PUBLICATIONS

China application No. 202110691207.8 , Chinese Office Action dated Nov. 15, 2022, with English Translation.

Chinese Application No. 2021106912078, Search Report dated Nov. 4, 2022.

Chinese Application No. 2021106912078, Supplementary Search Report dated Apr. 28, 2023.

* cited by examiner

METHOD FOR DESIGNING DIFFRACTIVE OPTICAL ELEMENT AND PARTITIONED UNIFORM LIGHT ILLUMINATION SYSTEM

RELATED APPLICATIONS

This application is a national phase of PCT No. PCT/CN2022/095969 filed May 30, 2022, which claims priority to Chinese Application No. 202110691207.8 filed on Jun. 22, 2021, entitled "Method for designing diffractive optical element and partitioned uniform light illumination system," the contents of which are incorporated herein by reference in their entirety.

TECHNICAL FIELD

The present disclosure generally relates to the technical field of laser display, and, in particular, to a design method of a diffractive optical element, a diffractive optical element, and a partitioned uniform light illumination system.

BACKGROUND

At present, an existing Time-Of-Flight (TOF) solution in the mobile phone industry is Indirect Time-Of-Flight. By utilizing an indirect solution of, for example, phase change in emission and acceptance light fields, a distance from a target object is calculated. Compared with the TOF ranging with a direct timestamp, an indirect measurement produces a relatively great error. For example, when multiple targets are tested, there will be an average value converted into so as to calculate a distance. Moreover, an indirect measurement is largely affected by environmental noise. Directly using timestamps to perform TOF ranging can solve these problems. Designing a sensor for Direct Time-Of-Flight requires partitioned uniform illumination in a target light field. In addition, it is also required to provide a uniformly distributed light field within a certain range in many other specific application scenarios.

Vertical cavity surface emitting lasers (VCSELs) are lasers used widely. Some diffractive optical elements (DOEs) are beam homogenizers used to make light uniform for the light field emitted by an entire VCSEL chip. However, when a DOE works on projecting a large field-of-view target light field, the light field undergoes pincushion distortion in the target light field region with a large field of view. Furthermore, the larger the field of view, the more serious the pincushion distortion, thereby affecting the reconstruction of 3D information.

The contents in the Background are only the technologies known by the disclosers, and do not necessarily represent the existing technologies in the field.

SUMMARY

In view of at least one defect in the existing technologies, the present disclosure provides a design method of a diffractive optical element, characterized in that the design method includes:
S101: determining a parameter of a light source and a target light field of the diffractive optical element;
S102: determining a distribution of a plurality of first microstructure pattern units on the diffractive optical element according to the parameter of the light source;
S103: dividing the target light field into a plurality of target maps, a superimposition of the plurality of target maps forming the target light field, and each of the first microstructure pattern units corresponding to one of the target maps;
S104: performing distortion pre-correction on the plurality of target maps respectively; and
S105: designing corresponding phase distributions of the plurality of first microstructure pattern units respectively, according to the plurality of corrected target maps and the parameter of the light source.

According to one aspect of the present disclosure, the step S104 includes: performing reversal correction for pincushion distortion from a plane to a sphere on the plurality of target maps respectively.

According to one aspect of the present disclosure, the plurality of target maps includes a plurality of strip light fields, and the step S104 further includes:
performing barrel correction on the plurality of strip light fields, an amplitude of correction increasing with an increase of the field of view.

According to one aspect of the present disclosure, the light source includes a plurality of strip VCSEL light source arrays, and the step S102 further includes:
dividing the diffractive optical element into a plurality of strip first microstructure pattern units according to position distributions of the plurality of strip VCSEL light source arrays, such that the plurality of strip VCSEL light source arrays correspond to the plurality of strip first microstructure pattern units on a one-to-one basis, and each of the strip VCSEL light source arrays irradiates on a corresponding strip first microstructure pattern unit.

According to one aspect of the present disclosure, the step S102 further includes:
dividing the first microstructure pattern units into a plurality of first microstructure subunits along a length direction of a strip.

According to one aspect of the present disclosure, the step S105 includes:
designing corresponding phase distributions of the first microstructure subunits according to the corrected target maps.

According to one aspect of the present disclosure, herein:
the diffractive optical element further includes a plurality of second microstructure pattern units arranged at the periphery of the plurality of first microstructure pattern units, such that all of an incident light spot from the light source is irradiated on the diffractive optical element.

According to one aspect of the present disclosure, the design method further includes:
designing corresponding phase distributions of the second microstructure pattern units according to the target maps of the first microstructure pattern units adjacent to the second microstructure pattern units and the parameter of the light source.

According to one aspect of the present disclosure, the second microstructure pattern units are divided into a plurality of second microstructure subunits of the same size as the first microstructure subunits, and the design method further includes:
calculating eccentric light source coordinates according to a relative position between each second microstructure subunit and a first microstructure subunit closest to the second microstructure subunit, and designing a corresponding phase distribution of the second microstructure subunit separately according to the eccentric light source coordinates and a target map of the closest first microstructure subunit.

The present disclosure further provides a diffractive optical element designed using the design method as described hereinabove.

The present disclosure further provides a uniform light illumination system including the diffractive optical element as described hereinabove.

A preferred embodiment of the present disclosure provides a design method of a diffractive optical element, whereby the diffractive optical element is divided into a plurality of first microstructure pattern units according to a VCSEL partitioned light source, the plurality of first microstructure pattern units each corresponding to one of the light source arrays of the VCSEL partitioned light source and a part of the target light field, and phase distributions of the first microstructure pattern units of the diffractive optical element are designed according to the parameters of the light source arrays and the corrected partial light fields. The present disclosure further provides a design method of a diffractive optical element to prevent light leakage, and enhances a target light field by utilizing the projection of a spliced region. In a preferred embodiment of the present disclosure, a VCSEL partitioned light source is combined with the diffractive optical element, so that a clear and non-distorted large field-of-view uniform light field can be projected; and the diffractive optical element is applied to a partitioned uniform light illumination system, which provides a technical guarantee for the uniform light illumination required by a DTOF system. In addition, the diffractive optical element provided by a preferred embodiment of the present disclosure can also be combined at will into an electronic device that requires uniform light projection, including but not limited to a mobile phone, a PAD, and an electronic lock.

BRIEF DESCRIPTION OF THE DRAWINGS

The drawings are used to provide a further understanding of the present disclosure and constitute a part of the specification, and are used to explain the present disclosure along with the embodiments of the present disclosure, but do not constitute any limitation to the disclosure. In the drawings.

DETAILED DESCRIPTION

Only certain exemplary embodiments will be briefly described below. As those skilled in the art will recognize, the described embodiments may be modified in various different ways without departing from the spirit or scope of the present disclosure. Therefore, the drawings and the following description are deemed essentially exemplary, and not limitative.

In the description of the present disclosure, it needs to be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position relations as shown in the accompanying drawings, and are used only for the purpose of facilitating description of the present disclosure and simplification of the description, instead of indicating or suggesting that the denoted devices or elements must be oriented specifically, or configured or operated in a specific orientation. Thus, such terms should not be construed to limit the present disclosure. In addition, such terms as "first" and "second" are only used for the purpose of description, rather than indicating or suggesting relative importance or implicitly indicating the number of the denoted technical features. Accordingly, features defined with "first" and "second" may, expressly or implicitly, include one or more of the features. In the description of the present disclosure, "plurality" means two or more, unless otherwise defined explicitly and specifically.

In the description of the present disclosure, it needs to be noted that, unless otherwise specified and defined explicitly, such terms as "installation" "coupling" and "connection" should be broadly understood as, for example, fixed connection, detachable connection, or integral connection; or mechanical connection, electrical connection or intercommunication; or direct connection, or indirect connection via an intermediary medium; or internal communication between two elements or interaction between two elements. For those skilled in the art, the specific meanings of such terms herein can be construed in light of the specific circumstances.

Herein, unless otherwise specified and defined explicitly, if a first feature is "on" or "beneath" a second feature, this may cover direct contact between the first and second features, or contact via another feature there-between, other than the direct contact. Furthermore, if a first feature is "on", "above", or "over" a second feature, this may cover the case that the first feature is right above or obliquely above the second feature, or just indicate that the level of the first feature is higher than that of the second feature. If a first feature is "beneath", "below", or "under" a second feature, this may cover the case that the first feature is right below or obliquely below the second feature, or just indicate that the level of the first feature is lower than that of the second feature.

The disclosure below provides many different embodiments or examples so as to realize different structures described herein. In order to simplify the disclosure herein, the following will give the description of the parts and arrangements embodied in specific examples. Of course, they are only for the exemplary purpose, not intended to limit the present disclosure. Besides, the present disclosure may repeat a reference number and/or reference letter in different examples, and such repeat is for the purpose of simplification and clarity, which does not represent any relation among various embodiments and/or arrangements as discussed. In addition, the present disclosure provides examples of various specific processes and materials, but those skilled in the art can also be aware of application of other processes and/or use of other materials.

The embodiments of the present disclosure will be described below with reference to the drawings. It should be appreciated that the embodiments described herein are only used to illustrate and explain the present disclosure, but not to limit the present disclosure.

Figure 1:
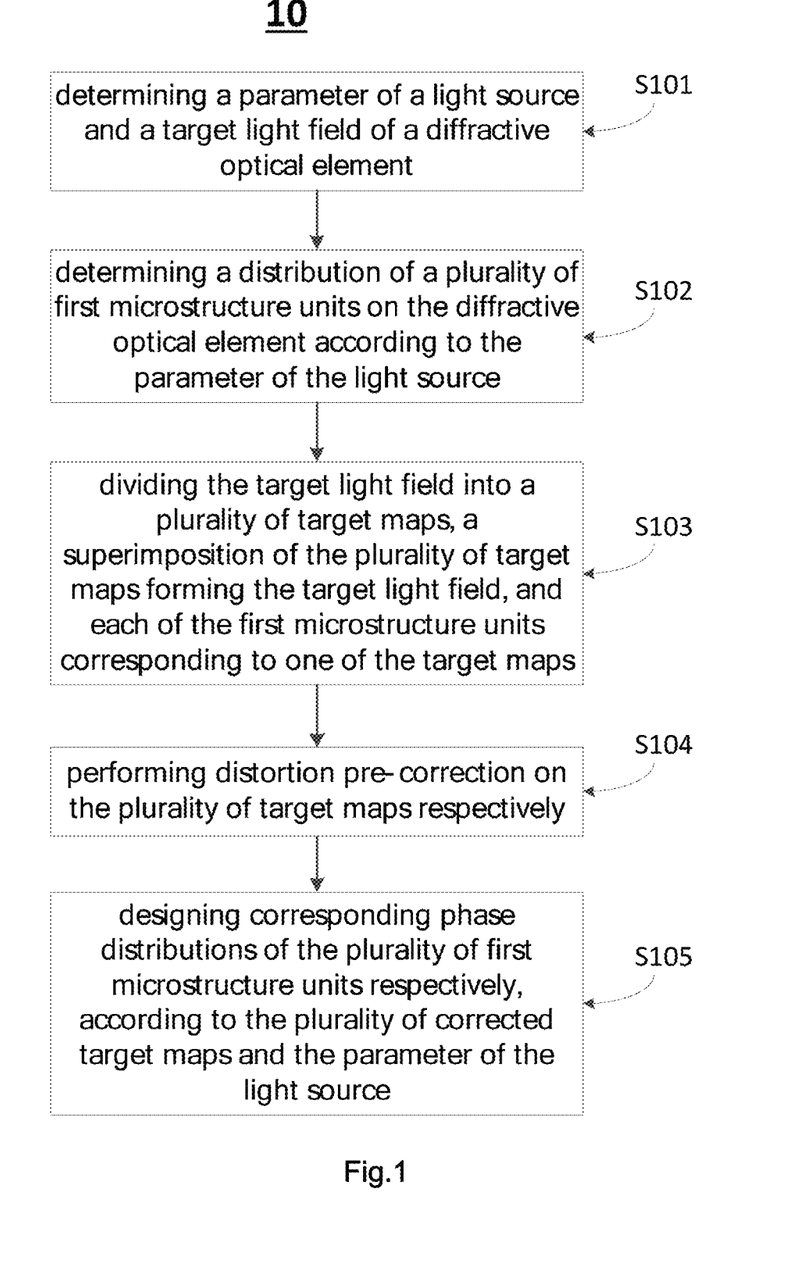
FIG. 1 illustrates a design method of a diffractive optical element according to one preferred embodiment of the present disclosure.

As shown in FIG. 1, according to one preferred embodiment of the present disclosure, the present disclosure provides a design method 10 of a diffractive optical element, including steps S101-S105.

In the step S101, a parameter of a light source and a target light field of the diffractive optical element is determined.

Figure 2:
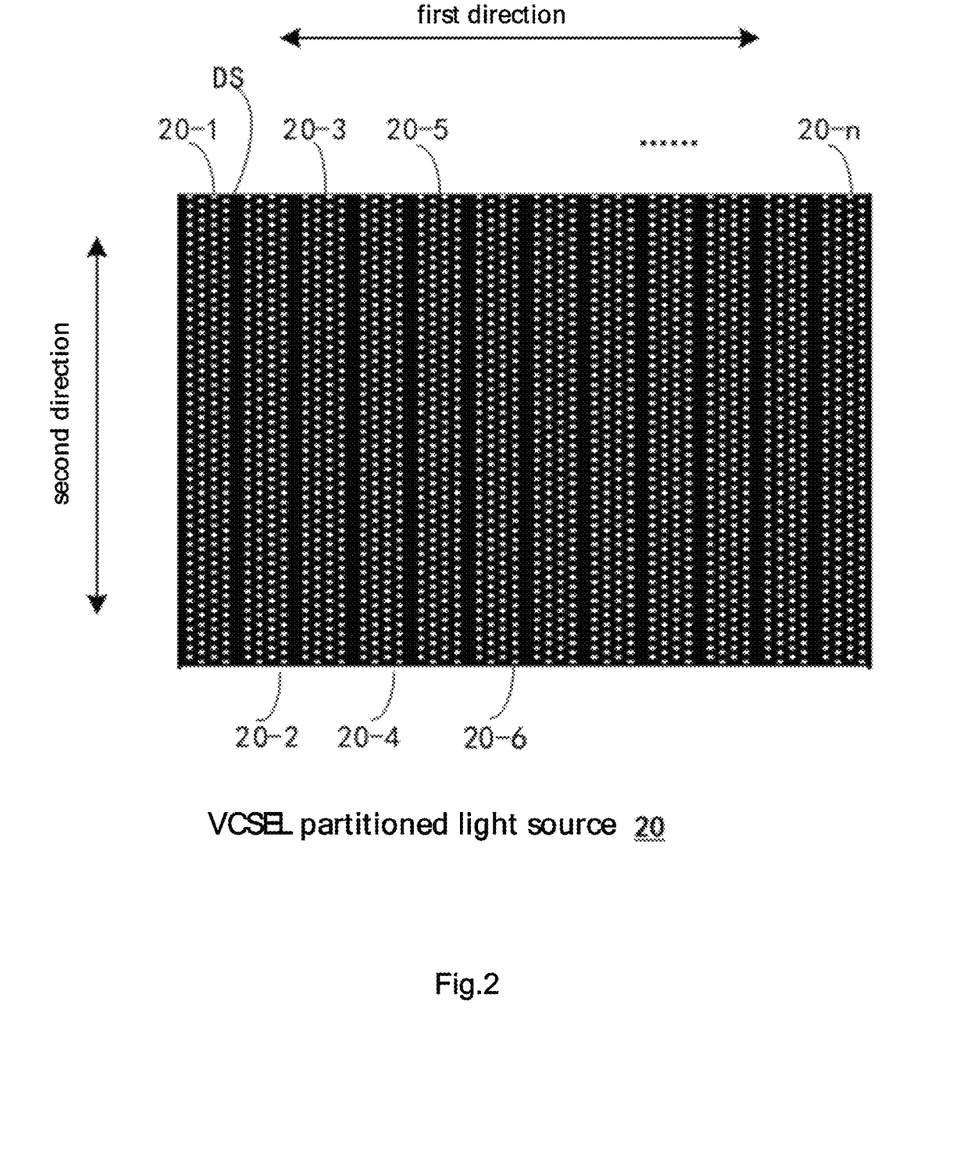
FIG. 2 schematically illustrates a VCSEL partitioned light source according to one preferred embodiment of the present disclosure.

As shown in FIG. 2, a preferred embodiment of the present disclosure adopts a vertical cavity surface emitting laser (VCSEL) partitioned light source 20, the VCSEL partitioned light source 20 including a plurality of light source arrays 20-1, 20-2 . . . 20-n. For example, due to process limitations, there is a gap between adjacent light source arrays, and a certain gap DS between the light source arrays in a first direction (i.e., the horizontal direction in the figure).

As shown in FIG. 2, each white dot inside each light source array represents a VCSEL light emitting point. The gap between adjacent VCSEL light emitting points is small, while the gap DS between adjacent light source arrays is usually large, and is larger than a distance between VCSEL light emitting points within one and the same light source array. In order to cooperate with the working of a DTOF sensor, it is required to achieve partitioned uniform light illumination of the target light field, namely, each light source array of the VCSEL partitioned light source can be lit up separately. When each light source array is lit up, only a part of the target light field corresponding to the light source array is uniformly illuminated, and it is required to ensure uniform light illumination of the entire target light field when all the light source arrays are lit up.

Figure 3A:
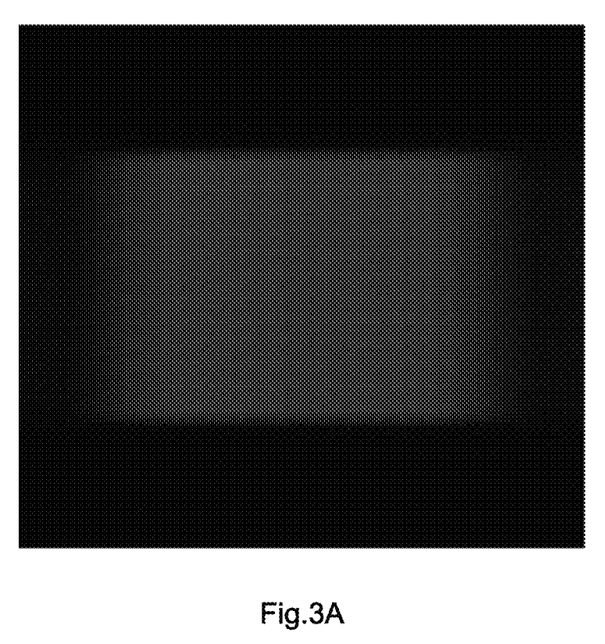
FIG. 3A schematically illustrates a uniform light field according to one preferred embodiment of the present disclosure.
Figure 3B:
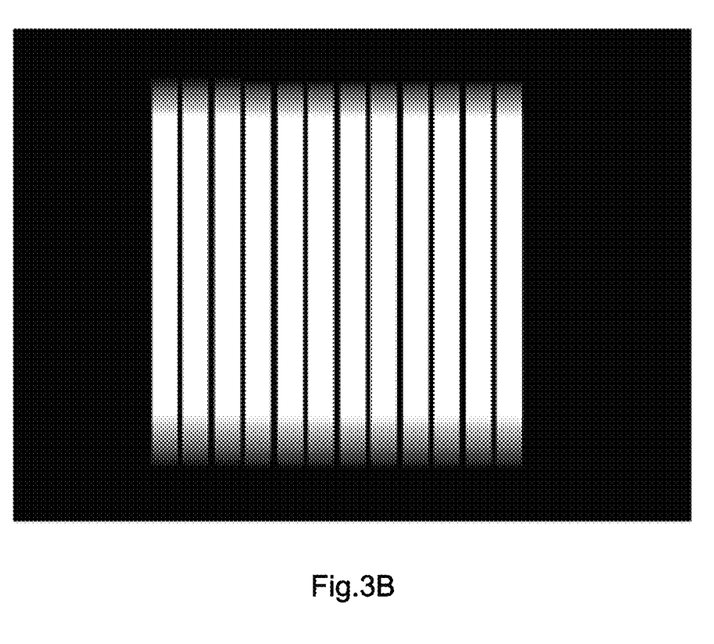
FIG. 3B schematically illustrates division of the uniform light field shown in FIG. 3A into a plurality of strip light fields according to one preferred embodiment of the present disclosure.

FIG. 3A shows a uniform light field required by the DTOF sensor. The uniform light field shown in FIG. 3A is divided into a plurality of strip light fields as shown in FIG. 3B according to the projection regions of the plurality of light source arrays of the VCSEL partitioned light source 20. When each light source array of the VCSEL partitioned light source 20 is lit up individually, one strip light field corresponding to the light source array is uniformly illuminated. When all the light source arrays are lit up, the plurality of strip light fields are spliced to form a target light field of the diffractive optical element.

In the step S102, according to the parameter of the light source, a distribution of a plurality of first microstructure pattern units on the diffractive optical element is determined.

Figure 4:
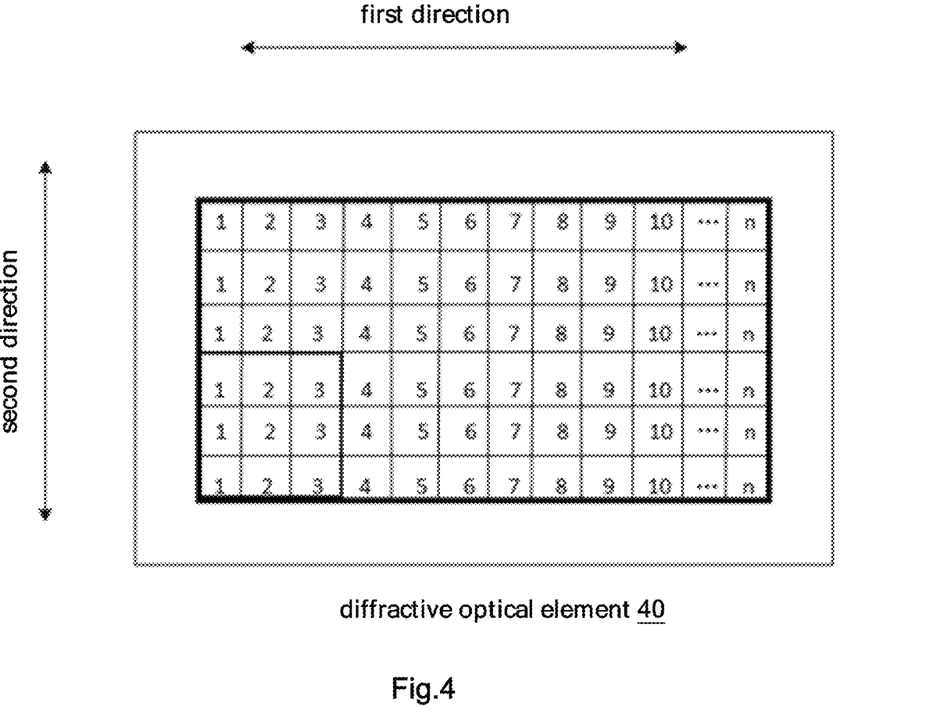
FIG. 4 schematically illustrates a diffractive optical element and first microstructure pattern units thereof according to one preferred embodiment of the present disclosure.

As shown in FIG. 4, the diffractive optical element 40 has a plurality of first microstructure pattern units. In the figure, a plurality of first microstructure subunits with the same mark number form one first microstructure pattern unit. For example, a plurality of first microstructure subunits with the mark number "1" forms one first microstructure pattern unit, . . . , a plurality of first microstructure subunits with the mark number "6" forms one first microstructure pattern unit, . . . , a plurality of first microstructure subunits with the mark number "n" forms one first microstructure pattern unit. Each of the first microstructure pattern units corresponds to one light source array of the VCSEL partitioned light source 20 shown in FIG. 2. For example, the plurality of first microstructure subunits with the mark number "1" forms one first microstructure pattern unit corresponding to one light source array 20-1 of the VCSEL partitioned light source 20, . . . , the plurality of first microstructure subunits with the mark number "6" forms one first microstructure pattern unit corresponding to one light source array 20-6 of the VCSEL partitioned light source 20, . . . , the plurality of first microstructure subunits with the mark number "n" forms one first microstructure pattern unit corresponding to one light source array 20-n of the VCSEL partitioned light source 20.

A width of each light source array of the VCSEL partitioned light source 20 as shown in FIG. 2 along a first direction (i.e., a distance between the centerlines of respective light source arrays in the width direction) is d, a length along a second direction is L, and the number of the light source arrays of the VCSEL partitioned light source 20 is n. According to the above size features of the VCSEL partitioned light source 20, the distributions of the plurality of first microstructure pattern units on the diffractive optical element 40 as shown in FIG. 4 are determined.

As shown in FIG. 4, a main region (the region with mark numbers in the figure) of the diffractive optical element 40 is divided into n first microstructure pattern units along the first direction, and each first microstructure pattern unit includes a plurality of first microstructure subunits with the same mark number, and is preferably divided in a uniform manner. If the width of each first microstructure pattern unit is d, then the width of each first microstructure subunit is also d (e.g., the width of each of the plurality of first microstructure subunits with the mark numbers "1", "6" and "n" is d). Let the length of each first microstructure subunit be i, which is selected to a certain degree of freedom, and the i may be d, or may also be greater or less than d. If the main region with the mark numbers is divided into m regions along the second direction, then i*m>L is preferred. Each first microstructure pattern unit corresponds to one light source array of the VCSEL partitioned light source shown in FIG. 2, and corresponds to a partial light field of the target light field projected from the light source array.

According to another preferred embodiment of the present disclosure, an integer multiple of the width of each first microstructure pattern unit is d, namely, the width of the first microstructure pattern unit is d/2, d/3, . . . . That is, the first microstructure pattern unit in the aforesaid embodiment is further segmented, and a plurality of first microstructure pattern units collectively correspond to one light source array of the VCSEL partitioned light source shown in FIG. 2, and correspond to a partial light field of the target light field projected from the light source array. This mode of implementation also falls within the scope of protection of the present disclosure.

Figure 5:
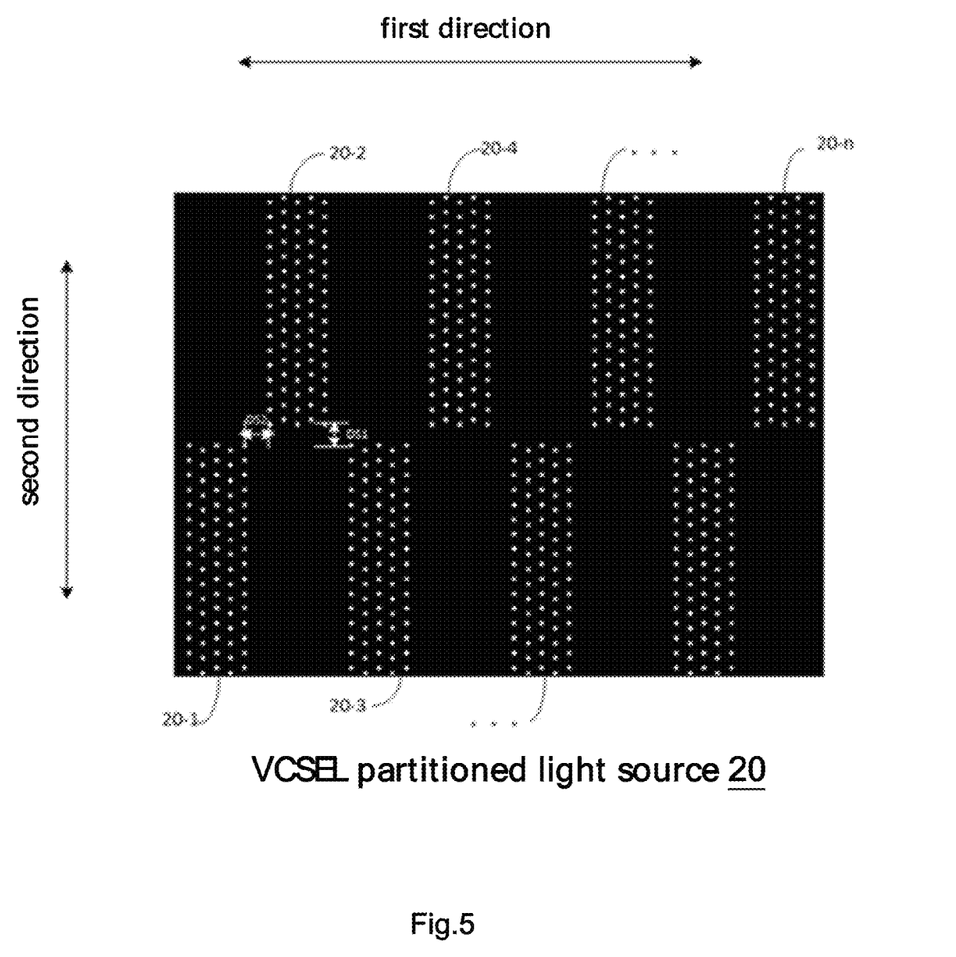
FIG. 5 schematically illustrates a VCSEL partitioned light source according to one preferred embodiment of the present disclosure.

As shown in FIG. 5, there are gaps between the plurality of light source arrays of the VCSEL partitioned light source along the first and second directions. The partitioned light source arrays 20 include a plurality of light source arrays 20-1, 20-2, . . . , 20-n, wherein there is a first gap DS1 between adjacent light source arrays along the first direction and a second gap DS2 therebetween along the second direction, with the first direction perpendicular to the second direction. The diffractive optical element 40 is designed correspondingly, so that the diffractive optical element 40 has a plurality of first microstructure pattern units, each first microstructure pattern unit corresponding to one light source array of the VCSEL partitioned light source 20 and corresponding to a partial light field of the target light field projected from the light source array. When the plurality of light source arrays of the VCSEL partitioned light source 20 are lit up, the light fields projected from the plurality of first microstructure pattern units of the diffractive optical element 40 are spliced to form a uniform light field required by the DTOF sensor. This mode of implementation also falls within the scope of protection of the present disclosure.

In the step S103, the target light field is divided into a plurality of target maps, a superimposition of the plurality of target maps forming the target light field, and each of the first microstructure pattern units corresponding to one of the target maps.

Figure 6:
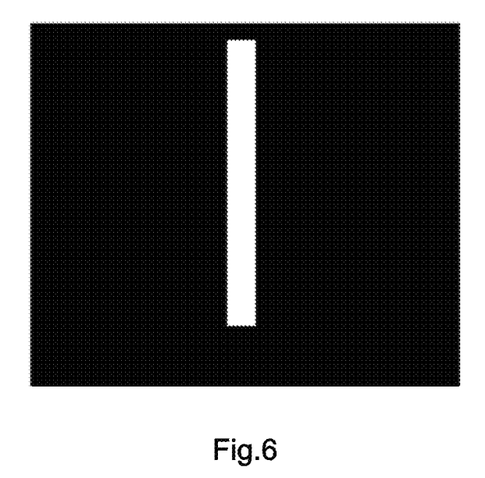
FIG. 6 schematically illustrates a strip target map according to one preferred embodiment of the present disclosure.

The diffractive optical element 40 as shown in FIG. 4 includes the plurality of first microstructure pattern units, which respectively correspond to the plurality of light source arrays of the VCSEL partitioned light source 20 as shown in FIG. 2 spaced apart along the first direction, and are used for making uniform the light beams received from the corresponding light source arrays. The phase distributions of the first microstructure pattern units are design in such a manner that one point light source can be projected into at least one linear light field extending along the second direction. For example, when computer-aided software is utilized to design the phase distributions of the first microstructure pattern units of the diffractive optical element 40, the light source is defined as a point light source, and the target map is designed as a strip light field extending along the second direction (as shown in FIG. 6). The strip light fields projected from the VCSEL light emitting points in the edge regions of two adjacent light source arrays are spliced or superimposed with each other, thereby forming a uniform light field required by the DTOF sensor.

In the step S104, distortion pre-correction is performed on the plurality of target maps respectively.

Figure 7:
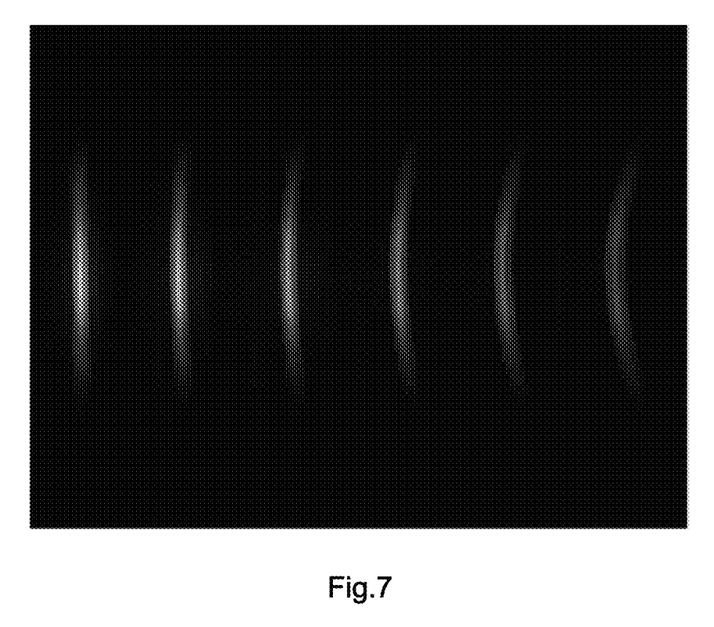
FIG. 7 schematically illustrates the pincushion distortion of a target light field with a large field of view.

Since the diffractive optical element may produce distortion in the case of large-field-of-view projection, the target light field undergoes pincushion deformation (as shown in FIG. 7), which affects the working quality of the DTOF system. According to one preferred embodiment of the present disclosure, at the time of designing the phase distribution of the diffractive optical element, barrel distortion is pre-introduced to compensate for the pincushion distortion in the case of a large field of view, thereby ensuring that the target light field is substantially in a strip shape.

Figure 8:
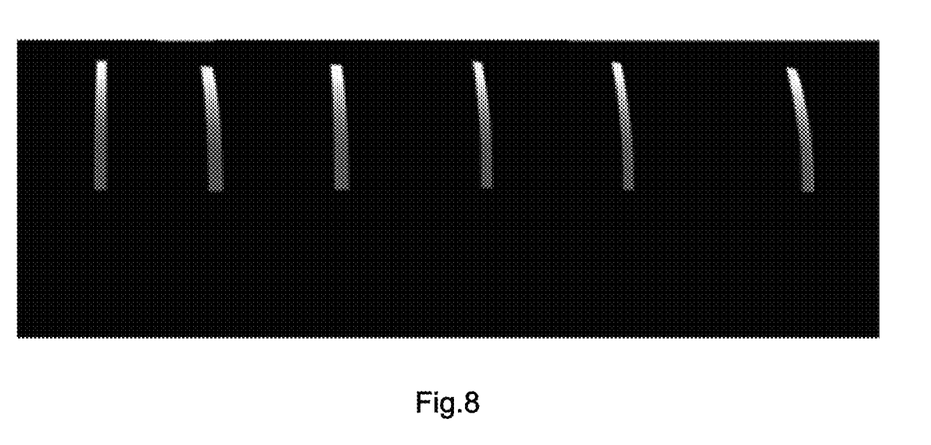
FIG. 8 schematically illustrates barrel correction for the pincushion distortion shown in FIG. 7 according to one preferred embodiment of the present disclosure.

According to one preferred embodiment of the present disclosure, each of the light source arrays of the VCSEL partitioned light source corresponds to at least one of the first microstructure pattern units of the diffractive optical element. For example, the diffractive optical element has first microstructure pattern units, the number of which is the same as that of the light source arrays of the VCSEL partitioned light source, namely, the light source arrays correspond to the first microstructure pattern units on a one-to-one basis. Since the diffractive optical element may produce pincushion distortion in the case of large-field-of-view projection, pre-correction for pincushion distortion can be performed on a first microstructure pattern unit corresponding to each light source array according to the field of view region where the light field projected from the light source array is located on the overall target light field. For example, at the time of designing the phase distributions of the first microstructure pattern units of the diffractive optical element, the corresponding barrel distortion is introduced for the target map of a strip light field to compensate for the pincushion distortion, and a curved strip target map with barrel distortion is used to replace the straight-line strip target map, thereby achieving the purpose of correction to the pincushion distortion. As shown in FIG. 8, a curved strip with barrel distortion is used as a target map to replace the straight-line target map. However, the present disclosure is not limited to this, and each of the light source arrays may also correspond to the plurality of first microstructure pattern units, namely, the first microstructure pattern units in the aforesaid embodiment are further segmented, and pincushion distortion pre-correction is performed on each further segmented first microstructure pattern unit to achieve a more finely optimized distortion correction result, thereby ensuring that the target light field is much closer to a rectangular shape.

In the step S105, according to the plurality of corrected target maps and the parameter of the light source, corresponding phase distributions of the plurality of first microstructure pattern units are designed respectively. Specifically, the step includes:

obtaining a target light field on a target surface, namely, the corrected target maps, parameters of corresponding light source arrays of the VCSEL partitioned light source, a distance between the target light field and the VCSEL partitioned light source, and a field of view of projection; and calculating phase distributions of the first microstructure pattern units of the diffractive optical element, so that the diffractive optical element can diverge and uniformly modulate the light beams emitted from the plurality of light source arrays of the VCSEL partitioned light source, and so that partial light fields projected by adjacent light source arrays on the target surface adjoin or overlap each other in the first direction.

According to one preferred embodiment of the present disclosure, the step S104 of the design method 10 of the diffractive optical element further includes: performing reversal correction for pincushion distortion from a plane to a sphere on the plurality of target maps respectively.

Since the design of the diffractive optical element is based on the theory of angular spectrum, it is required to calculate the light wave amplitude and/or phase on the angular spectrum, namely, to calculate the propagation and superimposition of the amplitudes and/or phases of light waves on a spherical surface. Therefore, at the time of designing the diffractive optical element, it is required to convert a predetermined planar light field pattern projected on a target plane, namely, a planar target map, into a corresponding spherical light field pattern, namely, a spherical target map. Reversal correction for pincushion distortion from a plane to a sphere is performed on the plurality of target maps respectively, and then phase distribution of the diffractive optical element is calculated based on the spherical target maps, a light source parameter, a projection working distance, a field of view, and other parameters.

According to one preferred embodiment of the present disclosure, the step S104 of the design method 10 of the diffractive optical element further includes: performing barrel correction on the plurality of strip light fields, an amplitude of correction increasing with an increase of the field of view (as shown in FIG. 8).

In the working process where the diffractive optical element performs projection, the positional relationship between a working region and a projection light field region conforms to the lens principle. As shown in FIG. 4, in the working region within the box at the lower left corner of the diffractive optical element 40, a projected light field is located at the upper right corner of the target light field region. Therefore, at the time of designing the phase distribution of the first microstructure pattern unit within the leftmost working region of the diffractive optical element 40, the target map on the rightmost side of the target light field region should be adopted. After pre-correction, the strip light field is corrected into a target light field with barrel distortion as bent to the right side. For the plurality of strip light fields, an amplitude of bending after correction increases with an increase of the field of view.

According to one preferred embodiment of the present disclosure, the step S102 of the design method 10 of the diffractive optical element further includes:

according to position distributions of the plurality of strip light source arrays of the VCSEL partitioned light source, dividing the diffractive optical element into a plurality of strip first microstructure pattern units, such that the plurality of strip light source arrays correspond to the plurality of strip first microstructure pattern units on a one-to-one basis, and each of the strip light source arrays irradiates on a corresponding strip first microstructure pattern unit.

As shown in FIG. 4, the diffractive optical element 40 is divided into a plurality of strip first microstructure pattern units along the first direction, in which a plurality of first microstructure subunits with the same mark number form one strip first microstructure pattern unit. Each of the first microstructure pattern units corresponds to one strip light source array of the VCSEL partitioned light source 20 shown in FIG. 2, for example, one strip light source array 20-1 of the VCSEL partitioned light source 20 irradiating on one strip first microstructure pattern unit formed by a plurality of first microstructure subunits with the mark number "1"; one strip light source array 20-6 of the VCSEL partitioned light source 20 irradiating on one strip first microstructure pattern unit formed by a plurality of first microstructure subunits with the mark number "6"; and one strip light source array 20-$n$ of the VCSEL partitioned light source 20 irradiating on one strip first microstructure pattern unit formed by a plurality of first microstructure subunits with the mark number "n".

According to another preferred embodiment of the present disclosure, the plurality of strip first microstructure pattern units in the aforesaid embodiment are further segmented along the first direction, so that some of the strip first microstructure pattern units collectively correspond to one strip light source array of the VCSEL partitioned light source, and pre-correction for pincushion distortion is performed on each further segmented strip first microstructure pattern unit, so that the light field effect is more refined. This mode of implementation also falls within the scope of protection of the present disclosure.

According to one preferred embodiment of the present disclosure, the step S102 of the design method 10 of the diffractive optical element further includes:

dividing the first microstructure pattern units into a plurality of first microstructure subunits along a length direction of a strip.

As shown in FIG. 4, the diffractive optical element 40 is divided into the plurality of strip first microstructure pattern units along the first direction, and each of the strip first microstructure pattern units is divided into a plurality of first microstructure subunits along the second direction (i.e., the length direction of the strip). A plurality of first microstructure subunits with the same mark number in the figure belongs to one and the same strip first microstructure pattern unit. In the figure, a plurality of first microstructure subunits with the mark number "1" form one strip first microstructure pattern unit, . . . , a plurality of first microstructure subunits with the mark number "6" form one strip first microstructure pattern unit, . . . , a plurality of first microstructure subunits with the mark number "n" form one strip first microstructure pattern unit. The first microstructure subunits with the same mark number correspond to the same light source array of the VCSEL partitioned light source, and adopt the same target light field map.

According to one preferred embodiment of the present disclosure, the step S105 of the design method 10 of the diffractive optical element further includes:

according to the corrected target maps, designing corresponding phase distributions of the first microstructure subunits.

According to a target light field on a target surface, namely, the corrected target maps, parameters of corresponding light source arrays of the VCSEL partitioned light source, a distance between the target light field and the VCSEL partitioned light source, and a field of view of projection, phase distributions of the first microstructure subunits are calculated, so that the light beams emitted from the corresponding light source arrays are diverged and uniformly modulated along, and so that partial light fields projected by adjacent light source arrays on the target surface adjoin or overlap each other in the first direction.

According to one preferred embodiment of the present disclosure, in the design method 10 of the diffractive optical element, the diffractive optical element further includes a plurality of second microstructure pattern units arranged at the periphery of the plurality of first microstructure pattern units, such that all of an incident light spot from the light source is irradiated on the diffractive optical element.

Figure 9:
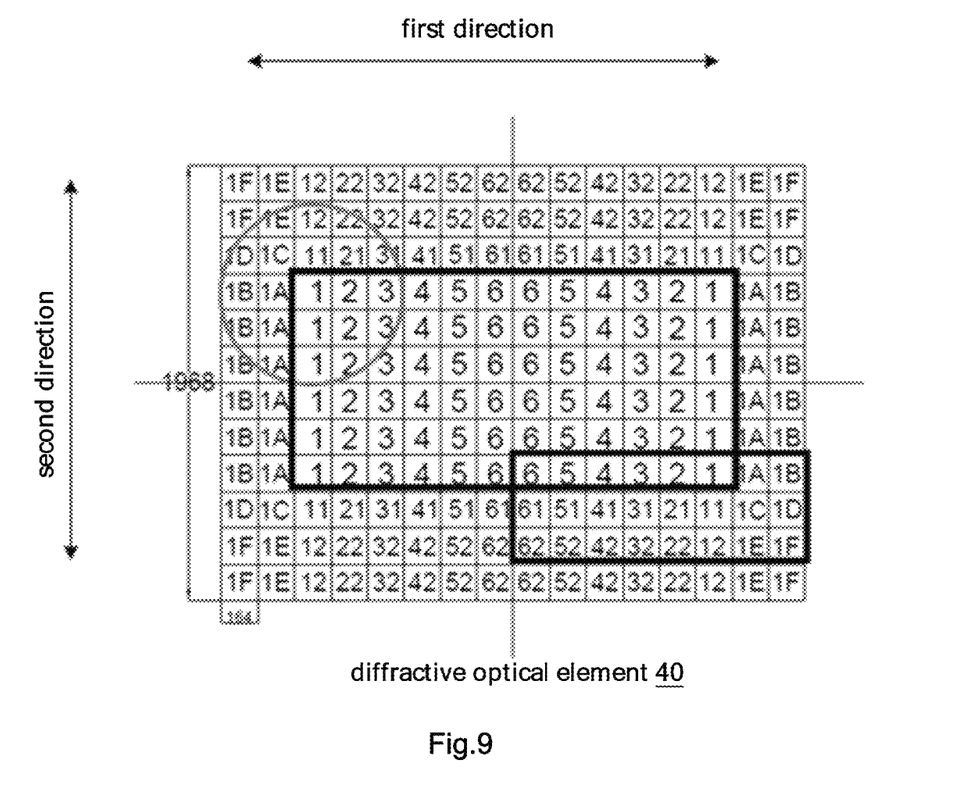
FIG. 9 schematically illustrates a main region and an anti-light leakage region of the diffractive optical element according to one preferred embodiment of the present disclosure.

In the actual working process, there is a certain distance between the VCSEL partitioned light source and the diffractive optical element, and a single point light source irradiates onto the diffractive optical element, forming one circle with a radius of r. As shown in FIG. 9, a single point light spot generated by the single point light source in the VCSEL partitioned light source is sized at, for example, 765 um (see the circular region in the figure), and the first microstructure subunits of the diffractive optical element are sized at 164 um. Then the phenomenon of light leakage will occur when the single point light spot is irradiated on the first microstructure subunits at the edge of the main region (see the square region in the center of the figure). Therefore, in order to prevent light leakage in the diffractive optical element, it is required to splice an additional region outside the main region of the diffractive optical element. By arranging the plurality of second microstructure pattern units at the periphery of the main region as an anti-leakage region, all of the incident light spot from the light source is irradiated on the diffractive optical element and projects out the target light field.

According to one preferred embodiment of the present disclosure, the design method 10 of the diffractive optical element further includes: designing corresponding phase distributions of the second microstructure pattern units according to the target maps of the first microstructure pattern units adjacent to the second microstructure pattern units and the parameter of the light source.

For a second microstructure pattern unit within the spliced anti-leakage region, the phase distribution is designed according to the target map of the first microstructure pattern unit adjacent to the second microstructure pattern unit and the parameter of the light source, so that the light irradiated on the second microstructure pattern unit projects a partial target light field the same as the first microstructure pattern unit adjacent to the second microstructure pattern unit, which increases the intensity of the target light field while preventing light leakage.

According to one preferred embodiment of the present disclosure, in the design method 10 of the diffractive optical element, the second microstructure pattern units are divided into a plurality of second microstructure subunits of the same size as the first microstructure subunits. The design method 10 further includes:

calculating eccentric light source coordinates according to a relative position between each second microstructure subunit and a first microstructure subunit closest to the second microstructure subunit, and designing a corresponding phase distribution of each of the second microstructure subunits separately according to the eccentric light source coordinates and a target map of the closest first microstructure subunit.

An additional anti-light leakage region is spliced outside the main region of the diffractive optical element. Preferably, a plurality of second microstructure subunits is arranged within the anti-light leakage region. For the convenience of processing, the plurality of second microstructure subunits are the same size as the plurality of first microstructure subunits within the main region. Let the width of the first microstructure subunits be d, the length be i, the number of single sides of the anti-leakage region extending from the main region along the first direction be kx, and the number of single sides extending from the main region along the second direction be ky, the following conditions are satisfied: $d*kx>r$, and $i*ky>r$.

Eccentric divergent light design is performed for the second microstructure subunits within the spliced anti-light leakage region. As shown in FIG. 9, by taking the first microstructure subunits and the second microstructure subunits within the rectangular box at the lower right corner as an example, at the time of designing the phase distributions of the second microstructure subunits with the mark numbers starting from "1", a target map is adopted, the same as the first microstructure subunits with the mark number "1", and an offset of the light source coordinates is set. For example, the eccentric light source coordinates of the second microstructure subunit "1A" are (−0.164, 0), the eccentric light source coordinates of the second microstructure subunit "1B" are (−0.328, 0), the eccentric light source coordinates of the second microstructure subunit 11 are (0, −0.164), the eccentric light source coordinates of the second microstructure subunit 1C are (−0.164, −0.164), and the eccentric light source coordinates of the second microstructure subunit 1D are (−0.328, −0.164), . . . .

Figure 10:
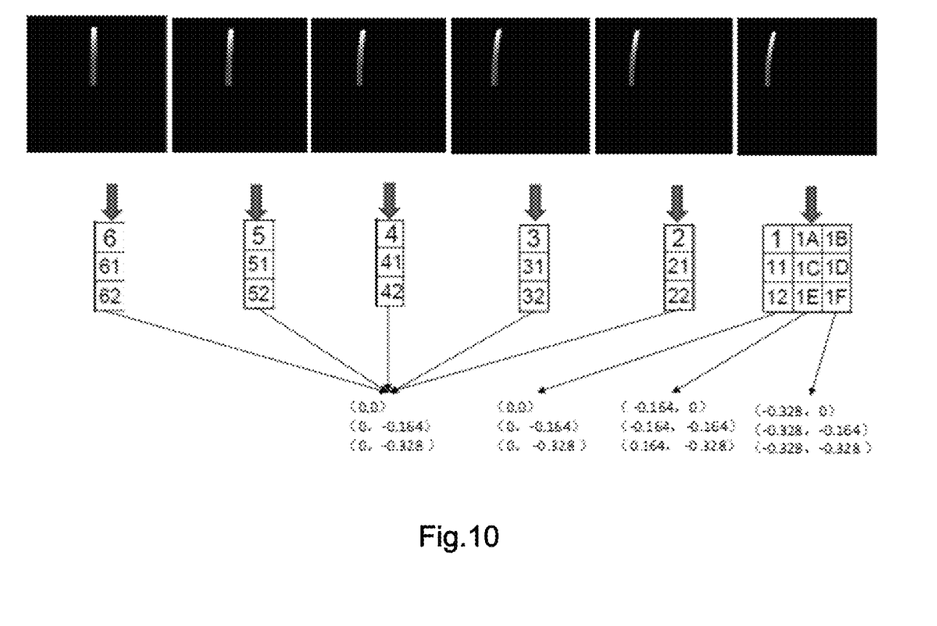
FIG. 10 schematically illustrates target maps and eccentric light source coordinates corresponding to some microstructure subunits in FIG. 9.

FIG. 10 illustrates the first and second microstructure subunits with different mark numbers, a corresponding corrected target light field, and corresponding offset light source coordinates.

According to one preferred embodiment of the present disclosure, the present disclosure also provides a diffractive optical element designed using the design method as described hereinabove.

Figure 11:
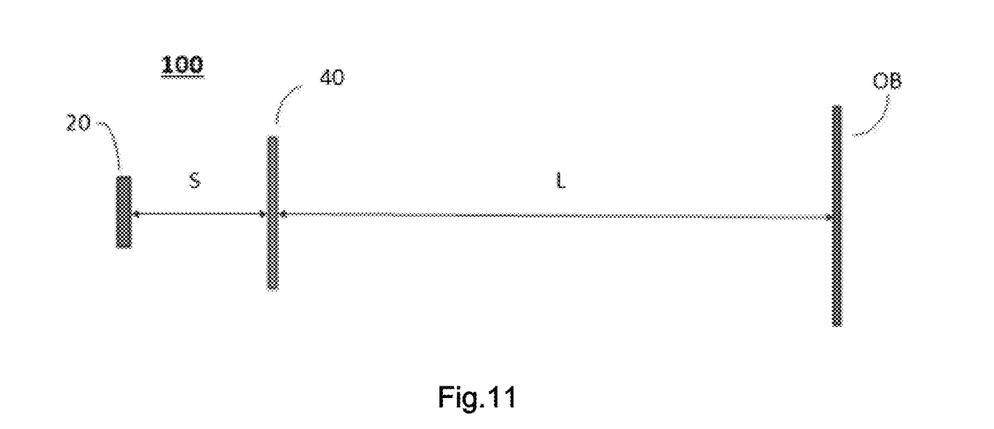
FIG. 11 schematically illustrates a partitioned uniform light illumination system according to one preferred embodiment of the present disclosure.

As shown in FIG. 11, according to one preferred embodiment of the present disclosure, the present disclosure also provides a uniform light illumination system 100 including the diffractive optical element 40 as described hereinabove.

As shown in FIG. 11, the partitioned uniform light projection system 100 includes a diffractive optical element 40 and a partitioned light source array 20, wherein the partitioned light source array 20 includes a plurality of light source arrays (see FIG. 2), there is a gap between the plurality of light source arrays in the first direction. The diffractive optical element 40, arranged downstream of the optical path of the partitioned light source array 20, can receive light beams emitted from the plurality of light source arrays and project a uniform light field on a target surface OB.

A preferred embodiment of the present disclosure provides a design method of a diffractive optical element, whereby the diffractive optical element is divided into a plurality of first microstructure pattern units according to a VCSEL partitioned light source, the plurality of first microstructure pattern units each corresponding to one of the light source arrays of the VCSEL partitioned light source and a part of the target light field, and phase distributions of the first microstructure pattern units of the diffractive optical element are designed according to the parameters of the light source arrays and the corrected partial light fields. The present disclosure further provides a design method of a diffractive optical element to prevent light leakage, and enhances a target light field by utilizing the projection of a spliced region. In a preferred embodiment of the present disclosure, a VCSEL partitioned light source is combined with the diffractive optical element, so that a clear and non-distorted large field-of-view uniform light field can be projected; and the diffractive optical element is applied to a partitioned uniform light illumination system, which provides a technical guarantee for the uniform light illumination required by a DTOF system. In addition, the diffractive optical element provided by a preferred embodiment of the present disclosure can also be combined at will into an electronic device that requires uniform light projection, including but not limited to a mobile phone, a PAD, and an electronic lock.

Article 1: A design method of a diffractive optical element, characterized by comprising:
S101: determining a parameter of a light source and a target light field of the diffractive optical element;
S102: determining a distribution of a plurality of first microstructure units on the diffractive optical element according to the parameter of the light source;
S103: dividing the target light field into a plurality of target maps, a superimposition of the plurality of target maps forming the target light field, and each of the first microstructure units corresponding to one of the target maps;
S104: performing distortion pre-correction on the plurality of target maps respectively; and
S105: designing corresponding phase distributions of the plurality of first microstructure units respectively, according to the plurality of corrected target maps and the parameter of the light source.

Article 2: The design method of Article 1, wherein step S104 comprises: performing reversal correction for pincushion distortion from a plane to a sphere on the plurality of target maps respectively.

Article 3: The design method of Article 2, wherein the plurality of target maps comprises a plurality of strip light fields, and the step S104 further comprises:
performing barrel correction on the plurality of strip light fields, an amplitude of correction increasing with an increase of a field of view.

Article 4: The design method of any one of Articles 1-3, wherein the light source comprises a plurality of strip VCSEL light source arrays, and step S102 further comprises:
dividing the diffractive optical element into a plurality of strip first microstructure units according to position distributions of the plurality of strip VCSEL light source arrays, such that the plurality of strip VCSEL light source arrays correspond to the plurality of strip first microstructure units on a one-to-one basis, and each of the strip VCSEL light source arrays irradiates on a corresponding strip first microstructure unit.

Article 5: The design method of Article 4, wherein the step S102 further comprises:
dividing the first microstructure units into a plurality of first microstructure subunits along a length direction of a strip.

Article 6: The design method of Article 5, wherein step S105 comprises:
designing corresponding phase distributions of the first microstructure subunits according to the corrected target maps.

Article 7. The design method of any one of Article 5, wherein:
the diffractive optical element further comprises a plurality of second microstructure units arranged at a periphery of the plurality of first microstructure units, such that all of an incident light spot from the light source is irradiated on the diffractive optical element.

Article 8: The design method of Article 7, further comprising:
designing corresponding phase distributions of the second microstructure units according to the target maps of the first microstructure units adjacent to the second microstructure units and the parameter of the light source.

Article 9: The design method of Article 8, wherein the second microstructure units are divided into a plurality of second microstructure subunits of the same size as the first microstructure subunits, and the design method further comprises:
calculating eccentric light source coordinates according to a relative position between each second microstructure subunit and a first microstructure subunit closest to the second microstructure subunit, and designing a corresponding phase distribution of the second microstructure subunit separately according to the eccentric light source coordinates and a target map of the closest first microstructure subunit.

Article 10: A diffractive optical element designed using the design method of any one of Articles 1-9.

Article 11: A partitioned uniform light illumination system comprising the diffractive optical element of Article 10.

It should be noted finally that the contents described above are only preferred embodiments of the present disclosure, and are not used to limit the present disclosure. Although the detailed description of the present disclosure has been provided with reference to the foregoing embodiments, those skilled in the art may still make modifications to the technical solution as recited in each of the foregoing embodiments, or make equivalent replacements for some of the technical features therein. Any modification, equivalent replacement, or improvement, etc., made within the spirit and principles of the present disclosure, should be included in the protection scope of the present disclosure.

We claim:

1. A design method of a diffractive optical element, characterized by comprising:
S101: determining a parameter of a light source and a target light field of the diffractive optical element;
S102: determining a distribution of a plurality of first microstructure pattern units on the diffractive optical element based on the parameter of the light source, wherein the parameter of the light source comprises a width along a first direction and a length along a second direction of each light source array of the light source, and a number of light source arrays of the light source;
S103: dividing the target light field into a plurality of target maps, a superimposition of the plurality of target maps forming the target light field, and each of the first microstructure pattern units corresponding to one of the target maps;
S104: performing distortion pre-correction on the plurality of target maps respectively, wherein the distortion comprises pincushion distortion; and
S105: designing corresponding phase distributions of the plurality of first microstructure pattern units respectively, based on the plurality of corrected target maps and the parameter of the light source, wherein the parameter of the light source further comprises a distance between the target light field and the light source, and a field of view of projection,
wherein the diffractive optical element further comprises a plurality of second microstructure pattern units arranged at a periphery of the plurality of first microstructure pattern units, such that all of an incident light spot from the light source is irradiated on the diffractive optical element, wherein the plurality of first microstructure pattern units is taken as a main region, and the plurality of second microstructure pattern units is taken as an anti-leakage region to prevent light leakage that occurs when the incident light spot is irradiated on first microstructure subunits at an edge of the main region.

2. The design method of claim 1, wherein step S104 comprises: performing reversal correction for pincushion distortion from a plane to a sphere on the plurality of target maps respectively, wherein the target light field undergoes the pincushion distortion, and wherein a planar target map is projected on the plane, and a spherical target map is projected on the sphere.

3. The design method of claim 2, wherein the plurality of target maps comprises a plurality of strip light fields, and the step S104 further comprises: performing barrel correction on the plurality of strip light fields, an amplitude of correction increasing with an increase of a field of view, wherein the barrel correction is used to introduce barrel distortion for the plurality of strip light fields to compensate for the pincushion distortion.

4. The design method of claim 1, wherein the light source comprises a plurality of strip VCSEL light source arrays, and step S102 further comprises:
dividing the diffractive optical element into a plurality of strip first microstructure pattern units according to position distributions of the plurality of strip VCSEL light source arrays, such that the plurality of strip VCSEL light source arrays correspond to the plurality of strip first microstructure pattern units on a one-to-one basis, and each of the strip VCSEL light source arrays irradiates on a corresponding strip first microstructure pattern unit.

5. The design method of claim 4, wherein the step S102 further comprises:
dividing the first microstructure pattern units into a plurality of first microstructure subunits along a length direction of a strip.

6. The design method of claim 5, wherein step S105 comprises:
designing corresponding phase distributions of the first microstructure subunits according to the plurality of corrected target maps.

7. The design method of claim 5, further comprising: designing corresponding phase distributions of the second microstructure pattern units based on the target maps of the first microstructure pattern units adjacent to the second microstructure pattern units and the parameter of the light source.

8. The design method of claim 7, wherein the second microstructure pattern units are divided into a plurality of second microstructure subunits of the same size as the first microstructure subunits, and the design method further comprises:
calculating eccentric light source coordinates according to a relative position between each second microstructure subunit and a first microstructure subunit closest to the second microstructure subunit, and designing a corresponding phase distribution of the second microstructure subunit separately according to the eccentric light source coordinates and a target map of the closest first microstructure subunit, wherein the eccentric light source coordinates characterize an offset of light source coordinates.

9. A diffractive optical element designed using the design method of claim 1.

10. A partitioned uniform light illumination system comprising the diffractive optical element of claim 9.

11. The partitioned uniform light illumination system of claim 10, wherein step S104 comprises: performing reversal correction for pincushion distortion from a plane to a sphere on the plurality of target maps respectively, wherein the target light field undergoes the pincushion distortion, and wherein a planar target map is projected on the plane, and a spherical target map is projected on the sphere, and wherein the plurality of target maps comprises a plurality of strip light fields, and the step S104 further comprises:
performing barrel correction on the plurality of strip light fields, an amplitude of correction increasing with an increase of a field of view, wherein the barrel correction is used to introduce barrel distortion for the plurality of strip light fields to compensate for the pincushion distortion.

12. The partitioned uniform light illumination system of claim 10, wherein the light source comprises a plurality of strip VCSEL light source arrays, and step S102 further comprises:
dividing the diffractive optical element into a plurality of strip first microstructure pattern units according to position distributions of the plurality of strip VCSEL light source arrays, such that the plurality of strip VCSEL light source arrays correspond to the plurality of strip first microstructure pattern units on a one-to-one basis, and each of the strip VCSEL light source arrays irradiates on a corresponding strip first microstructure pattern unit, and
wherein the step S102 further comprises:
dividing the first microstructure pattern units into a plurality of first microstructure subunits along a length direction of a strip, and
wherein step S105 comprises:
designing corresponding phase distributions of the first microstructure subunits according to the plurality of corrected target maps.

13. The partitioned uniform light illumination system of claim 10, wherein the light source comprises a plurality of strip VCSEL light source arrays, and step S102 further comprises:
dividing the diffractive optical element into a plurality of strip first microstructure pattern units according to position distributions of the plurality of strip VCSEL light source arrays, such that the plurality of strip VCSEL light source arrays correspond to the plurality of strip first microstructure pattern units on a one-to-one basis, and each of the strip VCSEL light source arrays irradiates on a corresponding strip first microstructure pattern unit, and
wherein the step S102 further comprises:
dividing the first microstructure pattern units into a plurality of first microstructure subunits along a length direction of a strip, and
the design method further comprising:
designing corresponding phase distributions of the second microstructure pattern units according to the target maps of the first microstructure pattern units adjacent to the second microstructure pattern units and the parameter of the light source, and
wherein the second microstructure pattern units are divided into a plurality of second microstructure subunits of the same size as the first microstructure subunits, and the design method further comprises:
calculating eccentric light source coordinates according to a relative position between each second microstructure subunit and a first microstructure subunit closest to the second microstructure subunit, and designing a corresponding phase distribution of the second microstructure subunit separately according to the eccentric light source coordinates and a target map of the closest first microstructure subunit.

14. The diffractive optical element of claim 9, wherein step S104 comprises: performing reversal correction for pincushion distortion from a plane to a sphere on the plurality of target maps respectively, wherein the target light field undergoes the pincushion distortion, and wherein a planar target map is projected on the plane, and a spherical target map is projected on the sphere.

15. The diffractive optical element of claim 14, wherein the plurality of target maps comprises a plurality of strip light fields, and the step S104 further comprises:
performing barrel correction on the plurality of strip light fields, an amplitude of correction increasing with an increase of a field of view, wherein the barrel correction is used to introduce barrel distortion for the plurality of strip light fields to compensate for the pincushion distortion.

16. The diffractive optical element of claim 9, wherein the light source comprises a plurality of strip VCSEL light source arrays, and step S102 further comprises:
dividing the diffractive optical element into a plurality of strip first microstructure pattern units according to position distributions of the plurality of strip VCSEL light source arrays, such that the plurality of strip VCSEL light source arrays correspond to the plurality of strip first microstructure pattern units on a one-to-one basis, and each of the strip VCSEL light source arrays irradiates on a corresponding strip first microstructure pattern unit.

17. The diffractive optical element of claim 16, wherein the step S102 further comprises:

dividing the first microstructure pattern units into a plurality of first microstructure subunits along a length direction of a strip.

18. The diffractive optical element of claim 17, wherein step S105 comprises:

designing corresponding phase distributions of the first microstructure subunits according to the plurality of corrected target maps.

19. The diffractive optical element of claim 17, further comprising:

designing corresponding phase distributions of the second microstructure pattern units based on the target maps of the first microstructure pattern units adjacent to the second microstructure pattern units and the parameter of the light source.

20. The diffractive optical element of claim 19, wherein the second microstructure pattern units are divided into a plurality of second microstructure subunits of the same size as the first microstructure subunits, and the design method further comprises:

calculating eccentric light source coordinates according to a relative position between each second microstructure subunit and a first microstructure subunit closest to the second microstructure subunit, and designing a corresponding phase distribution of the second microstructure subunit separately according to the eccentric light source coordinates and a target map of the closest first microstructure subunit, wherein the eccentric light source coordinates characterize an offset of light source coordinates.

\* \* \* \* \*